United States Patent [19]
Uchida et al.

[11] 3,915,762
[45] Oct. 28, 1975

[54] METHOD OF INITIATING SCARFING AND CONSUMABLE ELECTRODE THEREFOR

[75] Inventors: Youtaro Uchida; Yoshihiko Asai; Goro Miya, all of Tokai, Japan

[73] Assignee: Nippon Steel Corporation, Tokyo, Japan

[22] Filed: Aug. 2, 1974

[21] Appl. No.: 494,362

[52] U.S. Cl. .................................................. 148/9.5
[51] Int. Cl.² .......................................... B23K 7/02
[58] Field of Search ...... 148/95, 9 C; 219/145, 146, 219/69 E, 69 M; 266/23 Q, 23 H

[56] References Cited
UNITED STATES PATENTS

| 2,513,425 | 7/1950 | Lobosco | 266/23 H |
| 3,658,599 | 4/1972 | Svensson | 148/9.5 |

*Primary Examiner*—W. Stallard
*Attorney, Agent, or Firm*—Wenderoth, Link & Ponack

[57] ABSTRACT

In the method of initiating the scarfing process of surface defects of steel material as said to-be-scarfed material is moving relative to the movement of the scarfing machine having a scarfing nozzle, the improvement, which comprises a consumable electrode having a steel sheath filled with a oxygen source material and a combustible material being fed to a scarfing position on said to-be-scarfed material until its tip contacts said position, thereby heating rapidly the point on said to-be-scarfed material in contact with said electrode with electrical energy and heat of oxidation up to scarfing initiation temperature, and instantaneously starting scarfing operation with oxygen jetted from said scarfing nozzle from the position heated to such temperature.

1 Claim, 7 Drawing Figures

METHOD OF INITIATING SCARFING AND CONSUMABLE ELECTRODE THEREFOR

BACKGROUND OF THE INVENTION

The present invention relates to a method of instantaneously initiating the scarfing process of surface defects of steel material, and also to a consumable electrode used for said method. The scarfing equipment is generally used in steel mills and the like for conditioning defects on steel products such as slabs, blooms, or billets. The kind of the scarfing equipment for treating steel material of high temperature is called the "hot scarfer" which instantaneously starts the scarfing process with high-pressure oxygen jetted from the scarfing nozzle. But for treating cold material, there must be used the so-called cold scarfer after the scarfing position has been heated up to the temperature, at which oxidation may take a rush.

Usually in the case of scarfing cold material, the scarfing position must be heated more than 10 seconds. Such long heating time not only lowers operation efficiency but also makes it impossible to do the so-called flying start of scarfing operation, according to which scarfing operation is started as the scarfing machine is moving, or without stopping the movement of to-be-scarfed material; these constituting disadvantages of the conventional method of scarfing cold material.

In order to shorten the heating time, there have been presented to public knowledge the following methods:

First, to provide, in front of the scarfing nozzle, a nozzle for jetting powder of a metal such as iron into pre-heating flames, thereby producing a great volume of heat energy by the combustion such metal powder with oxygen and mechanical energy through the jetting of such metal powder, for speedy local heating of the scarfing position. Secondly, to feed a starting rod of small diameter until it contacts the scarfing position in front of the scarfing nozzle, so as to melt the tip of said rod with pre-heating flames issued from the scarfing nozzle for the production of molten drops for heating and melting the scarfing position.

However, these methods are successful only in shortening the heating time more or less, but not in achieving an instantaneous initiation of the scarfing process. According to the first method, 4 to 5 seconds are required before the start of scarfing operation. And according to the second method, 6 to 10 seconds are required. Such lengths of the heating time as mentioned above do not make possible a flying start of scarfing operation either.

SUMMARY OF THE INVENTION

Having been made for the solution of the abovementioned problems with the conventional methods of initiating the scarfing process, the present invention provides as an object, a method of initiating the scarfing process instantaneously, preferably for less than 1 second, thereby making possible a flying start of scarfing operation of such high velocity as is impossible according to the conventional methods.

Another object of the present invention is to provide a method of initiating the scarfing process exactly, making it possible to scarf surface defects of steel material very efficiently.

A further object of the present invention is to provide a consumable electrode suited for the practice of the abovementioned method.

The abovementioned and other objects of the present invention will appear more clearly from the detailed explanation and embodiments which are mentioned below.

In order to achieve the abovementioned objects thermethod of the present invention which is to initiate the scarfing process of to-be-scarfed material as said to-be-scarfed material is moving relative to the movement of the scarfing machine having a scarfing nozzle, comprises feeding a consumable electrode made of a steel sheath containing a oxygen source material and a combustible material toward a scarfing position on said to-be-scarfed material until its tip contacts said position, heating rapidly the point on said to-be-scarfed material in contact with said electrode with electrical energy and heat of oxidation up to the scarfing initiation temperature, and instantaneously starting scarfing operation with oxygen jetted from said scarfing nozzle from the position heated to such temperature.

Also, the consumable electrode of the present invention which is suited for the practice of the abovementioned method of initiating the scarfing process, comprises the steel sheath containing a powder mixture of a oxygen source material 5 to 50 percent by weight and of iron powder as a combustible material as the rest.

DESCRIPTION OF THE PREFERRED EMBODIMENT

The following is detailed explanation of the method of initiating the scarfing process of to-be-scarfed material according to the present invention, as it is applied to steel slab as to-be-scarfed material standing still, with a scarfing machine is running.

Figure 1:
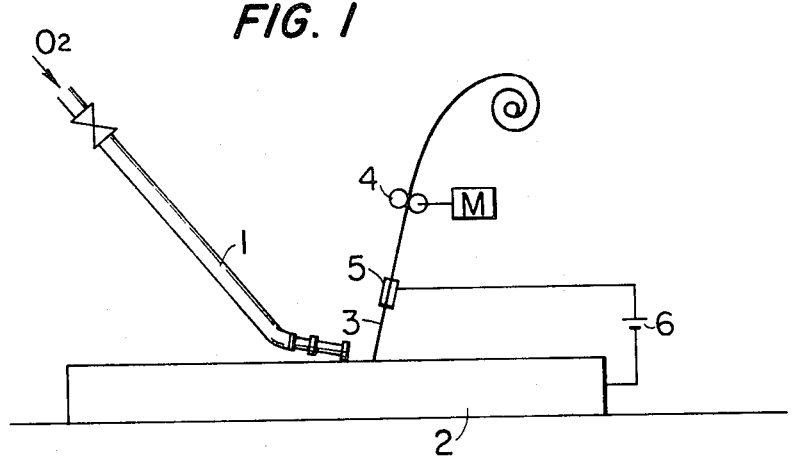
FIG. 1 is an illustration of the principle of the present invention.

Referring to FIG. 1 explaining the principle of the present invention, 1 denotes a scarfing nozzle which is mounted on the scarfing machine (not shown) running alon a slab 2, and the rear end of which is connected with an oxygen supplying pipe and a mixed gas supplying pipe. 3 denotes a consumable electrode provided opposite to said scarfing nozzle 2 and pointing to a scarfing position (the position at which the extension of the center of the scarfing nozzle crosses the surface of the slab). Said electrode 3 is fed to the scarfing point by means of feeding rollers 4 provided on the scarfing machine. Said electrode is sheathed with a steel shell and filled with a powdery mixture of such a oxygen source material as iron oxide and of a combustible material such as iron powder occasionally added with aluminum powder. 5 denotes a electricity supplying tip provided near the tip of the consumable electrode 3. 6 denotes an electric source connected with said electricity supplying tip 5 and the steel slab 2.

When the scarfing nozzle 1, approaches a selected scarfing position, as it is jetting oxygen, electricity is switched on to the electrode 3 and the steel slab 2, and the feeding rollers 4 are motivated to feed the electrode 3 to the scarfing position. When the tip of the electrode 3 contacts the scarfing position on the surface of the steel slab 2, there is produced short-circuit current, which produces Joul heat (contact resistance heat) for rapid heating of the tip of the electrode and the contact point on slab 3 in joint effect and heat of oxidation (mentioned below), thereby completing the initiation of the scarfing process, that is, forming the scarfing starting zone where scarfing operation is to start. When the tip of the electrode 3 is molten, arc is produced between the electrode 3 and the steel slab 2, which promotes the heating of the scarfing starting zone and the melting of the electrode. Thus, molten drops fall over the scarfing starting zone, helping the width of the zone extend on.

At the same time with the heating of the contacting part with electrical energy produced by Joul effect and arc effect, the oxygen source material such as iron oxide contained in the electrode is heated to a high temperature with Joul heat or arc heat, and dissolves so as to generate nascebt oxygen; and the combustible material such as iron powder contained in the electrode 3 is also heated in the same manner as mentioned above, so as to react with the said oxygen, therefore rapidly producing heat of oxidation. The addition of aluminum powder will make the volume of oxidation heat even greater.

As the effect of electrical energy consisting of Joul heat and arc heat jointly with heat of oxidation, the scarfing position is heated instantaneously up to the scarfing initiation temperature (more than 1,350°C), and the electrode 3 is molten in a greater amount. As a result, it is made possible to instantaneously start scarfing operation with oxygen jetted from the scarfing nozzle 1 from the point which has been heated to the scarfing initiation temperature. As for the initiation of the scarfing process, (the scarfing initiation), it continues until the scarfing initiating zone is extended to the desired width as the completion of the scarfing start. Upon the completion of the scarfing start, the electrode 3 is lifted back.

By the way, it is possible according to the present invention to make a flying start only with Joul heat as electrical energy, jointly with heat of oxidation.

As mentioned above, the heating of the scarfing position with electrical energy jointly with heat of oxidation is made so rapidly that the time from the first contact of the electrode 3 to the scarfing position to the completion of the scarfing initiation is as short as 0.2 to 0.8 second, that is, in a moment, making it possible to do exact scarfing operation even as the scarfing machine is running, that is, the so-called flying start.

Figure 2:
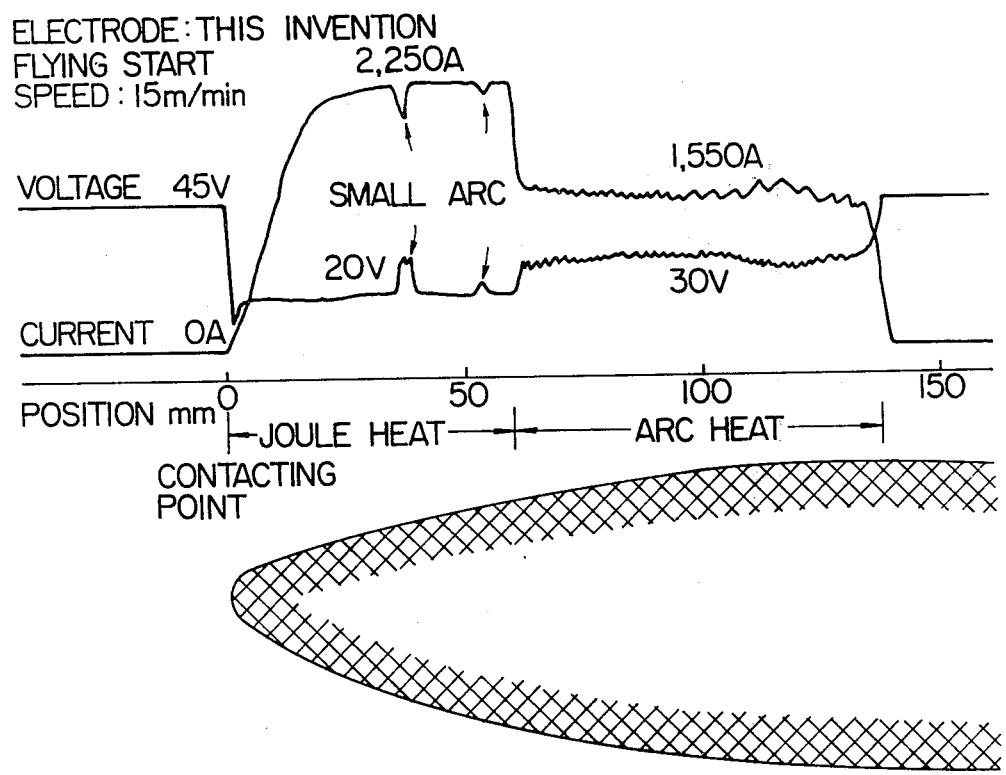
FIG. 2 is a schematic representation of the change of the potential between the electrode and the slab, the change of current and the shape of the to-be-scarfed area on the steel slab, in case the scarfing process is initiated by using the consumable electrode of the present invention.

Referring to FIG. 2, there are shown, the change of the potential between the electrode and the steel slab, the change of current, and the shape of to-be-scarfed area in terms of on the horizontal axis of the distances of respective points on the to-be-scarfed area from the contacting point between the electrode and to-be-scarfed material.

As shown in this figure, potential falls at the contacting point from no-load voltage to contacting resistance voltage, while current rises there rapidly, that is, to 2,250A as a maximum in 0.15 second. Thus, the heating of the contacting point according to the present invention is made by Joul heat produced by such great amperage of current, jointly with heat of oxidation of combustible material with oxygen source material both contained in the electrode, instantaneously completing the scarfing initiation; and as the tip of the electrode is molten, arc is produced to generate arc heat. Such heat of oxidation and arc heat promote the production of molten drops. Such molten drops fall over the scarfing initiation zone, so as to supply heat until full extension of to-be-scarf-initiated zone to the desired width.

Figure 3:
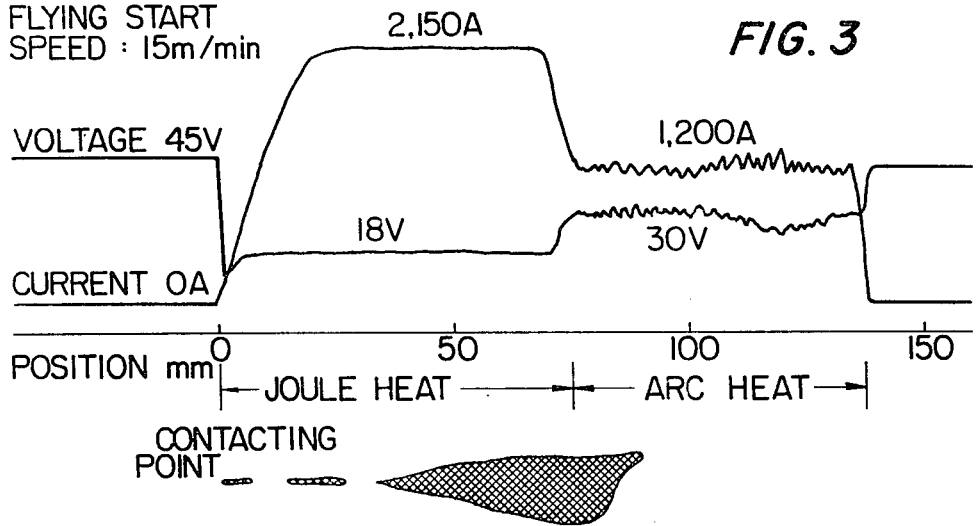
FIG. 3 is a schematic representation of the change of the potential between the electrode and the slab, the change of amperage, and the shape of the to-be-scarfed area on the steel slab, in case the scarfing process is initiated on the same conditions as in the case of FIG. 2 but the use of an electrode made of steel wire.

In comparison between FIG. 2 and FIG. 3, the latter of which shows the scarfing start on the same condition as in the case of FIG. 2 but with the electrode made of steel wire of conventional type, the wavy forms of voltage and amperage are nearly equivalent, but scarfing operation in the case of FIG. 3 can not continued because of no joint effect from heat of oxidation; moreover, scarfing operation discontinues, as shown in the figure, because of the shortage of molten drops of the electrode, making impossible a flying start.

According to the present invention, the scarfing initiation is started with Joul heat, then the extension of the scarfing initiation gone is made by addition of arc heat. It may go without the addition of arc heat for the continuance of the scarfing initiation, if the scarfing speed is set slow, say, 10 m/min. As shown in FIG. 2, during the period of heating with Joul heat, there has already been produced a small arc, which, however, does not matter, if Joul heat works as the main heat source. As for the feeding method of the electrode according to the present invention, a DC motor is usually used. According to the present invention, the electrode feeding speed is controlled on the detection of the voltage between the electrode and the steel slab, so as to produce an arc of about 30 V; therefore, the conversion to the heating with arc heat is made in a very short time after the contact with the steel slab, when an electrode of high melting speed is used.

Figure 5A:
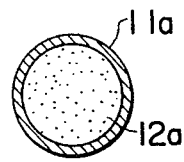
Figure 5B:
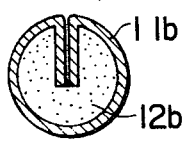
Figure 5C:
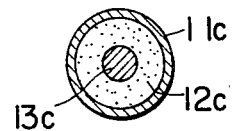

As for the cross-section of the consumable electrode according to the present invention, refer to FIG. 5, (a), (b) and (c). FIG. 5 (a) shows an electrode having the steel sheath 11a made of round pipe filled with a mixture 12a of a oxygen source material and a combustible material. FIG. 5 (b) shows an electrode whose steel sheath 11b is made of a shell with both ends rolled in, and filled with a mixture 12b of a peroxide and a combustible material. FIG. 5 (b) shows an electrode having the steel sheath 11c filled with a mixture 12x of a peroxide and a combustible material, and containing, at the center, a steel core wire 13c. According to the present invention, the feeding of a consumable electrode is preferred to be so made that the consumable electrode which has been made into a long wire wound on a spool into a coil for stock is supplied continuously as it is consumed by uncoiling it from the coil, For this purpose, the shell can better be made of mild steel, and the mixture of a oxygen source material and a combustible material should be filled so tightly as not to slide off the sheath. The best size for the outside diame of such electrode is 2 to 5 mm.

The following is explanation of the composition of a peroxide and a combustible material to fill the consumable electrode for the scarfing initiation method of the present invention.

As the peroxide as oxygen source, hematite ($Fe_2O_3$) or magnetite ($Fe_3O_4$) are most preferred; and part of the abovementioned materials can be substituted by one or more of peroxide such as $BaO_2$, perchlorate such as $KClO_4$ and permanganate such as $KMnO_4$. As the combustible material, iron powder is preferred; and aluminum powder can be added thereto, so as to promote the production of oxidation heat. The following table discloses the relations between the composition of respective materials and the time from the contact of the electrode to the completion of scarfing initiation;

Table 1

| No. | Composition (wt %) | | | Time from electrode contact to completion of scarfing initiation (second) |
|---|---|---|---|---|
| | Iron oxide power | Al powder | Fe powder | |
| 1 | 3 | — | 97 | 1.5 |
| 2 | 5 | — | 95 | 0.8 |
| 3 | 10 | — | 90 | 0.4 |
| 4 | 20 | — | 80 | 0.3 |
| 5 | 40 | — | 60 | 0.3 |
| 6 | 50 | — | 50 | 0.6 |
| 7 | 60 | — | 40 | 1.2 |
| 8 | 20 | 5 | 75 | 0.2 |
| 9 | 20 | 10 | 70 | 0.2 |
| 10 | 20 | 15 | 65 | 2.0 |
| 11 | — | — | — | 3.0 |
| 12 | 40 | — | 60 | 0.4 |

Remark: Case No. 12 used only Joul heat as electrical energy.

Referring to the above table, Cases Nos. 2 to 6, 8, 9 and 12 represent the scarfing initiation which can be completed within one second. This provides that the content of iron oxide should be more than 50 percent; an iron oxide content of less than 50 percent makes short supply of oxygen source, that is, short production of oxidation heat, while a content of more than 50 percent brings about imbalance with the content of iron powder, resulting also in short production of oxidation heat. Anyway the shortage of oxidation heat requires longer time before the completion of scarfing initiation that is before the start of scarfing operation.

The addition of aluminum powder in an appropriate quantity as in case Nos. 8 and 9, promotes the production of oxidation heat, making easier the start of scarfing operation, more specifically, making it possible to satart scarfing operation in 0.2 second.

However, if aluminum powder is added more than 10 percent, $Al_2O_3$ forms in a greater quantity, making difficult the start of scarfing operation, as in the case of Case No. 10, where the aluminum powder content of 15 percent resulted in the requirement of as much as 2 seconds before the start of scaifing operation. Thus, it is necessary to restrict the addition of aluminum powder less than 10 percent. As substances for promoting the production of oxidation heat, there are available magnesium and calcium which will be effective, if added in a small quantity.

As for the proportion by weight between the total filler (the mixture of a oxygen source material and a combustible material) and the total weight of the electrode, it should be more than 50 percent. If less than 5 percent, there will occur short production of oxidation heat because of the shortage of oxygen source material and combustible material.

As mentioned above, the use of the electrode filled with the so prescribed filler, makes possible to start scarfing operation within one second from the contact of the electrode with the to-be-scarfed material, even in 0.2 second, if the optimum prescription is used. If such efficient equipment as mentioned is mechanically set on the running truck, it will be made possible to start scarfing operation even while it is running at a speed of more than 10 m/min. Moreover, according to the present invention, the electrode can be made into the form of wire wound into a coil, therefore, it can be supplied continuously by uncoiling from the coil, as it is consumed, so it can be used for longer time without refilling work than other types of electrode.

Figure 4:
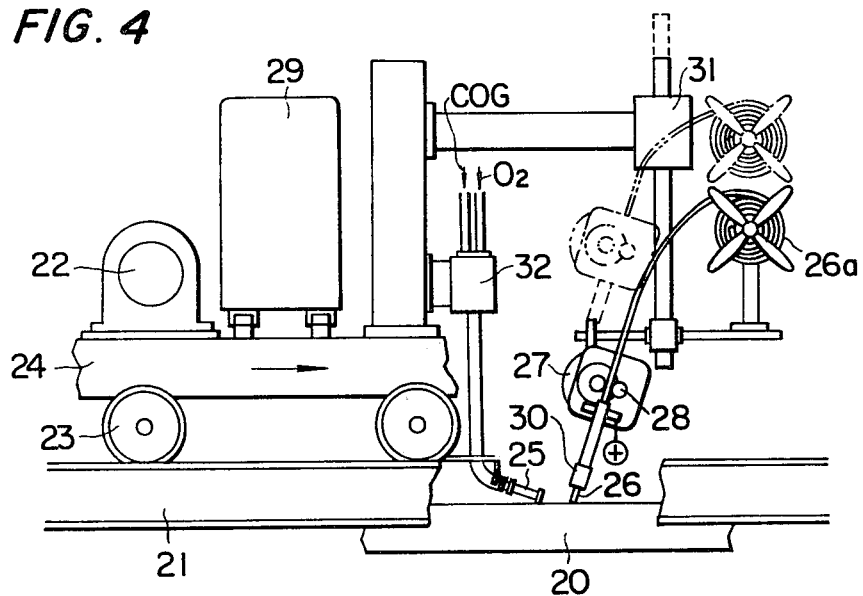
FIG. 4 is a side view of an embodiment of the scarfing machine for practising the scarfing initiation method of the present invention FIG. 5 (a), (b) and (c) are cross-sectional views respectively of embodiments of the consumable electrode for the scarfing initiation method of the present invention.

FIG. 4 shows an embodiment of the self-running scarfing machine for the practice of the method of the present invention. A self-running truck 24 runs on wheels 23 along rails 21, as it is motivated by a motor 22, as if it bridged over a steel slab 20. On said truck 24, there are mounted a scarfing nozzle 25, an electrode wire 26 filled with a oxygen source material and a combustible material for scarfing initiation and the like and their accessories. The scarfing nozzle 25 has its tip set slant at a certain angle against the scarfing surface and the direction of progress, on a holding member 32 of the truck 24 for free vertical movement. Also, its rear end is connected with the sources of oxygen and fuel supply. The electrode wire 26 is fed from the coil 26a on the electrode feeding motor 27 to the scarfing position through the feeding rollers 28. Current supply to said wire 26 is made from a electric power source 29 mounted on the truck 24 through a guide and an electricity supply tip 30. On the other hand, the steel slab 20 is connected with another terminal of said power source 29.

The tip of said electrode wire 26 contacts the surface of the steel slab 20 for scarfing initiation, but should be lifted back immediately after the completion of scarfing start, so it may be advisable to have a apparatus which suspends the electrode wire and its accessories as a whole suspended for free vertical movement by means of an oil pressure device 31. Instead of using the truck of self-running type for the movement of the scarfing equipment, the same operational effect can be obtained by the movement of the steel slab 20 by means of such as a roller table. As for the supply method of a consumable electrode, the continuous supply from a coil is not the only method; it may be possible to supply straight electrode bars of a certain length one after another.

In the case of scarfing the steel slab by using the equipment of FIG. 4, move the scarfing machine over the steel slab 20, and feed the electrode wire 26 by means of the motor 27 to the scarfing position and switch on the electric source 29 to introduce current to said electrode wire 26 through the electricity supplying tip 30 right when the equipment comes over the to-be-scarfed area.

As for the temperature rise at the scarfing point and the melting of the electrode, refer to the explanation of FIG. 1; the initiation of the scarfing process is completed instantaneously in this case, too. After the completion of the scarfing start, motivate the oil pressure device 31 to lift back the electrode wire 26 as shown with the clothed line of FIG. 4, so as not to hinder scarfing operation. In FIG. 4, only one scarfing nozzle is shown, but it is also possible to use a plurality of scarfing nozzle each having an electrode of the present invention for the simultaneously start of scarfing operation.

EXAMPLE:

Scarfing equipment: Self-running scarfer as shown in FIG. 4.
Scarfing speed: 15 m/min.
Size of to-be-scarfed area: 80 mm wide × 1 m long (partial scarfing)
Oxygen pressure at scarfing nozzle: 6 kg/cm$^2$
Protection flame: GOG flame
Electrode wire used: 3.2 $\phi$
Combustible material: 20 percent for Case No. 4, Table 1; cross-section of wire: See FIG. 5 (a)
Electric power source for starting the scarfing process: DC current 3000 A max.; wire plus As the abovementioned conditions were used, the initiation of the scarfing process was completed 0.3 second after the contact of the electrode with the to-be-scarfed material, making it possible to do scarfing operation at the scarfer was running. When using the electrode wire and the composition of Case No. 8 Table 1.

On the same conditions as mentioned above, the initiation of the scarfing process was completed 0.2 second after the contact of the electrode, where scarfing operation could be made very smoothly with the running scarfer.

What is claimed is:

1. A method of starting the scarfing process of surface defects of to-be-scarfed material as said to-be-scarfed material is moving relative to the scarfing machine having a scarfing nozzle, which comprises feeding a consumable electrode having a steel sheath filled with a oxygen source material and a combustible material to a scarfing position on said to-be-scarfed material until its tip contacts said position, heating rapidly the point on said to-be-scarfed material in contact with said electrode with electrical energy and heat of oxidation up to scarfing initiation temperature, and instantaneously starting scarfing operation with oxygen jetted from said scarfing nozzle from the position heated to such temperature.

* * * * *